United States Patent [19]

Gunter et al.

[11] Patent Number: 4,613,923
[45] Date of Patent: Sep. 23, 1986

[54] DIELECTRIC FLUID

[75] Inventors: Wolfgang Gunter, Wezembeek, Belgium; Guido Nespoli, Milan, Italy

[73] Assignee: Exxon Research & Engineering Co., Florham Park, N.J.

[21] Appl. No.: 661,962

[22] Filed: Oct. 17, 1984

[30] Foreign Application Priority Data

Nov. 1, 1983 [GB] United Kingdom ............... 8329134

[51] Int. Cl.$^4$ .......................... H01G 4/22; H01B 7/00
[52] U.S. Cl. ................................. 361/315; 174/26 R
[58] Field of Search ............... 252/567, 570, 581; 174/17 LF, 25 C, 25 R, 26 R; 361/311–319, 433 E

[56] References Cited

U.S. PATENT DOCUMENTS

| 3,358,071 | 12/1967 | Eich et al. ............... 252/567 X |
| 4,355,346 | 10/1982 | Gauger et al. ............ 361/319 X |
| 4,491,684 | 1/1985 | Vecellio .................. 174/26 R |

FOREIGN PATENT DOCUMENTS

| 0001494 | 9/1979 | European Pat. Off. |
| 0027935 | 10/1980 | European Pat. Off. |
| 46-28739 | 8/1971 | Japan. |
| 50012063 | 4/1973 | Japan. |
| 5106885 | 1/1974 | Japan. |
| 49-105781 | 7/1974 | Japan. |
| 50-012064 | 8/1975 | Japan. |
| 2029444 | 3/1980 | United Kingdom. |
| 2091289 | 7/1982 | United Kingdom. |
| 2094338 | 9/1982 | United Kingdom. |

OTHER PUBLICATIONS

Chemical Abstracts, vol. 87, No. 10, Sep. 5, 1977, Columbus, Ohio, p. 119, abstract No. 87:70 305y (Matsumoto et al.).
Patents Abstracts of Japan, unexamined applications, E section, vol. 2, No. 137, Nov. 15, 1978 (Kokai No. 53-104900).

Primary Examiner—Donald A. Griffin
Attorney, Agent, or Firm—Jack B. Murray, Jr.

[57] ABSTRACT 1-phenyl-1-tetrahydronaphthyl-ethane or an alkyl-substituted derivative thereof is useful as dielectric fluid in capacitors and undersea power cables having low flammability, high aromaticity and high density.

8 Claims, No Drawings

DIELECTRIC FLUID

This invention relates to dielectric fluids for use in electrical applications and in particular to fluids for use as a dielectric medium in electrical capacitors and for use as an insulating liquid in undersea power cables.

In a variety of electrical applications there is a need for a dielectric or insulating fluid, and a variety of organic liquids have been used in such applications.

GB No. 2091289 describes an electric power cable comprising a solid layered insulation and provided with at least one conduit filled with an insulation liquid being 1-phenyl-1-xylylethane (PXE) and/or mono-isopropyl-diphenyl.

GB No. 2029444 describes a capacitor comprising a metal foil, a dielectric spacer and a dielectric fluid, which fluid comprises di-isopropyl-benzene and optionally mono- or tri-isopropyl-benzene.

GB No. 2094338 describes a dielectric insulating fluid particularly suitable for use in electrical capacitors which comprises at least one hydrocarbon of the general formula:

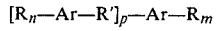

$$[R_n—Ar—R']_p—Ar—R_m$$

wherein Ar is a benzene, di- or polyphenyl, or naphthalene ring, R is H, alkyl or cycloaliphatic, R' is at least $C_2$ alkylene group which may be substituted, n and m are 1–5 and p is at least 1. Typical hydrocarbons are 1,2-ditolylethane and its trinuclear homologues and 1,2-dimethyl phenyl-ethane and its trinuclear homologue.

J51-06885 describes a functional fluid having electrical insulating properties which comprises cyclopentyl-tetralin or cyclopentyl-biphenyl.

J28739/71 describes an electrical insulating oil comprising a tetralin optionally substituted by an alkyl group on the benzene ring and alkyl groups in the 1 and/or 2 positions.

We have now found a highly aromatic material with excellent dielectric and insulating properties, which may be particularly useful in applications such as capacitors and/or power cables and/or spark erosion apparatus.

Thus, in one aspect the invention provides the use of 1-phenyl-1-tetrahydronaphthyl-ethane (PTE) or an alkyl substituted derivative thereof as a dielectric medium in an electrical application.

Among the possible derivatives of PTE for use in the invention are 1-xylyl-1-tetrahydronaphthyl-ethane, 1-dimethyl-phenyl-1-tetrahydronaphthyl-ethane and 1-isopropyl-phenyl-1-tetrahydronaphthyl-ethane as well as derivatives in which the tetrahydronaphthyl nucleus has one or more alkyl substituents. PTE itself is preferred.

As indicated hereinafter in the Examples PTE shows excellent electrical properties relative to known dielectric media. In particular PTE has a high dielectric constant (relative permittivity) and low dielectric loss factor (dissipation factor) and these properties are also stable over longer periods of time than conventional fluids.

In a particular embodiment this invention provides the use of PTE or an alkyl substituted derivative thereof as a dielectric medium for a capacitor. The invention also provides a capacitor comprising at least one layer of dielectric material in which that layer is impregnated with PTE or an alkyl substituted derivative thereof.

The capacitors of the invention will normally comprise layers of metal foil alternating with a dielectric spacer impregnated with the dielectric fluid. The insulation layers may comprise a single layer for example of a plastics material, or be built up of different materials, such as plastic film/paper/plastics composite film.

Polychlorinated biphenyl (PCB) had traditionally been a preferred insulation liquid for capacitor impregnation due to its good electrical characteristics and non-inflammability but it is now unacceptable because of toxicity concerns.

As described hereinbefore PXE has been used in this application as have alkylated naphthalenes (AN). We have found now PTE to show significant improvements over the existing synthetic aromatic hydrocarbons. An important requirement for dielectric fluids in capacitors is low flammability. The flammability of hydrocarbon oils may be judged from their flash points which are related to their distillation range which in turn is related to their vapour pressure characteristics. Table 1 shows the flash points and distillation ranges of PTE, PXE and AN.

TABLE 1

| Distillation range and flash point of dielectric fluids | | |
|---|---|---|
| Fluid | Distillation range-°C. | Flash point-°C. |
| PXE | 290–305 | 149 |
| AN | 286–300 | 150 |
| PTE | 332–355 | 194 |

PTE clearly has significantly lower flammability.

It is desirable for dielectric fluids to be aromatic, as a material with an aromatic nucleus, is more likely to have good resistance to corona discharge and also the hydrogen absorption capacity or "gassing" performance tends to be better than that of mineral oils. The aliphatic part of such fluids normally will provide a wider temperature range of fluidity, but will also decrease corona and "gassing" performance. Table 2 shows the numbers of carbon atoms of aromatic, aliphatic and cycloaliphatic nature in PTE, PXE and AN.

TABLE 2

| Number of aliphatic, cycloaliphtic and aromatic carbon atoms in dielectric fluids | | | |
|---|---|---|---|
| | Number of carbons | | |
| Fluid | Aliph. | Cycloaliph. | Aromatic |
| PXE | 4 | — | 12 |
| AN | 6 | — | 10 |
| PTE | 2 | 4 | 12 |

We found that cycloaliphatic carbons take an intermediate position between aliphatics and aromatics, so that the high degree of aromaticity and decreased number of aliphatic carbons in PTE relative to AN are expected result in an overall capacitor performance which is significantly improved over AN.

In another preferred embodiment this invention provides the use of PTE or an alkyl substituted derivative thereof in electric power cables. Thus the invention provides electric power cables comprising a conductor surrounded by one or more solid layers of insulation material and provided with at least one longitudinal conduit, the solid insulation sheets and/or the conduit being filled with PTE or an alkyl substituted derivative thereof. In particular the invention concerns electric cables which are suitable for submarine use, especially in depths of 300 to 600 m.

There are very few liquids which meet the combination of required properties for submarine power cables, where in particular the fluid density is a major factor.

We have now found, that PTE or an alkyl substituted derivative thereof may provide significant improvements to hollow core submarine power cables. PTE or its derivative can be used in this application either alone or in combination with other oils.

The density of the dielectric fluid for undersea power cables is preferably as close as possible to that of seawater so as to prevent or minimize any difference between the hydrostatic pressure inside and outside the cable which will cause stress in the amouring of the cable. Presently used dielectric fluids in undersea power cables are mineral oils, alkylbenzenes with alkylchains containing 9–12 carbon atoms or highly aromatic synthetic oils like mono-isopropylbiphenyl (MIPB) or PXE. Table 3 lists the densities of PTE and the conventional products concerned:

TABLE 3

| Densities of dielectric fluids, 20° C. (kg/l) | |
|---|---|
| Compound | Density, 20° C. |
| PXE | 0.9874 |
| MIPB | 0.9841 |
| Decylbenzene | 0.8613 |
| Dodecylbenzene | 0.8663 |
| PTE | 1.0245 |
| Caribbean sea | 1.0273* |
| Open sea | 1.0247* |

*Density at 22.2° C.

It is obvious from Table 3, that the density of PTE is much closer to that of seawater than the presently used hydrocarbon dielectrics so that a submarine cable including PTE will have to bear only a minimum of mechanical hydrostatic stress as compared to the other fluids. Thus, it will be possible to reduce the amouring of the cable and maintain the same safety factor as traditional cables.

The viscosity of the insulation liquid should preferably be such that whatever the temperature to which the cable is subjected and whatever the position and attitude of the cable is, the insulation liquid in the conduit is able to move through the cable. PTE and its derivatives have adequate pumpability over the whole normal temperature range, and in particular in the temperature range of 40°–90° C., which is the normal operation condition for a submarine power cable.

The gas absorption capacity of the dielectric, known as "gassing", should be high, so to minimise the risk of breakdowns. As discussed above, high levels of aromaticity result in much better resistance to the effects of corona generating overvoltages. In particular alkyl-groups, which have to be used in biphenyl- or naphthalene compounds to provide wider range fluidity, are known to be poor in terms of resistance to high voltage stress. Hydrogen is generated and persists, which causes further discharges. Moreover, those fluids containing a lot of alkyl groups, such as decylbenzene do not absorb hydrogen as aromatics apparently do.

Table 4 provides data on the relative aromaticity of the compounds described in Table 3, expressed as percentage of aromatic carbon atoms.

TABLE 4

| Relative aromaticity of dielectric fluids, % | |
|---|---|
| Compound | Relative aromaticity, % |
| PXE | 72 |
| MIPB | 78 |
| Decylbenzene | 35 |
| Dodecylbenzene | 31 |
| PTE | 64 |

Table 4 shows that PTE has an aromaticity level twice as high as the commonly used alkylbenzenes. The aromaticity level relative to the other two compounds mentioned is lower. However, as discussed above PTE contains a cycloaliphatic substituent, which take an intermediate position in terms of "gassing" between alkyl-groups and aromatics.

The flash point of the dielectric oil should be as high as possible, thus significantly simplifying the cable manufacturing process and reducing the risk of fire during the manufacturing of the cable.

Table 1 provides the flash points of PTE, PXE and AN. Table 5 shows the flash point for other conventional power cable liquids as compared to PTE.

TABLE 5

| Flash point of dielectrics in open cup, °C. (ASTMD 92-72) | |
|---|---|
| Compound | Flash point, °C. |
| MIPB | 155 |
| Decylbenzene | 124 |
| Dodecylbenzene | 134 |
| PTE | 194 |

The data clearly demonstrate an additional flash point advantage for PTE, which not only facilitate the manufacturing process, but also provides an additional safety margin.

The thermal expansion coefficient of dielectric fluids is also important in undersea power cables since when the cable is operational the dielectric fluid heats up, typically to 80° to 100° C., and it is therefore desirable for the thermal expansion to be low since this reduces strain on the cable structure. Table 6 shows the thermal expansion coefficient for PTE in comparison with that for PXE. PTE shows a significantly reduced thermal expansion coefficient.

TABLE 6

| Coefficient of thermal expansion (°C.$^{-1}$ measured at 10°–90° C.) | |
|---|---|
| PTE | $6.4 \times 10^{-4}$ |
| PXE | $7.1 \times 10^{-4}$ |

The invention also provides for the use of PTE or an alkyl-substituted derivative thereof as spark erosion fluid. Spark erosion fluids fulfil various functions. They are principally electrical insulators, which insulate the electrodes, so as to enable electrode gaps to be made as small as possible.

To reach a high "spark yield" or efficiency, the fluid preferably easily forms ions. Other requirements include low conductivity so that the formation of the discharge channels is discouraged. On top of that, the fluid is a heat transfer medium, carrying away the heat of discharges from the electrode gap. Too little heat capacity and/or high viscosity requiring low pumping speed will lead to vapour or gas formation and oxidation, which adversely affects the operation. The fluid should also not attack the rubber gaskets of the equipment.

PTE and its alkyl substituted derivatives provide a combination of properties suited to their use as spark erosion fluid.

Purity is another general requirement for dielectrics, as increasing levels of impurities and increasing number of components in the compound will increase the tendency of the fluid to decompose, which in turn will adversely affect the resistance to discharge and will overall decrease the life time of the whole cable.

PTE may be made from single component raw materials under well controlled conditions and specific catalysis, which yields a high purity product, consisting essentially of two PTE isomers, around 92% of the tetrahydronaphthyl ring being substituted in the 1 position and 8% in the 2 position.

Thus, PTE may be prepared for example, by a process in which tetrahydropnaphthalene is reacted with styrene in the presence of an acid catalyst such as sulphuric acid, silica-alumina or an acid-treated clay. Such processes are described in J50-012064 and J50-012063. Alkyl substituted derivatives may be prepared in an analogous manner.

The electrical properties of the invention will now be demonstrated in more detail in the following tests which are presented by way of illustration only.

TESTS OF ELECTRICAL PROPERTIES

A series of tests were conducted to determine the dielectric performance of PTE. By way of comparison measurements were also carried out on PXE and MIPB. The following tests were conducted:

1. Dielectric breakdown, measured by the procedure of IEC 156.
2. Relative permitivity or dielectric constant, measured by AMS 500.67 1 kHz and temperatures of at 20° C. and 90° C.
3. Dissipation factor or dielectric loss factor, measured by IEC 247 at 20° C. and 90° C.
4. Gassing, measured by IEC 628 at 10 kV/80° C.

The results are set out below in Table 7.

TABLE 7

| Test | Electrical Properties | | |
|---|---|---|---|
| | PTE | PXE | MIPB |
| Dielectric Breakdown (kV/2.5 mm) | 80 | 90 | 68 |
| Relative permitivity | | | |
| 20° C. | 2.75 | 2.55 | 2.66 |
| 90° C. | 2.75 | 2.50 | 2.53 |
| Dissipation factor | | | |
| 20° C. | $2 \times 10^{-4}$ | $3 \times 10^{-4}$ | $9 \times 10^{-4}$ |
| 90° C. | $40 \times 10^{-4}$ | $96 \times 10^{-4}$ | $1024 \times 10^{-4}$ |
| Gassing (μl/min) | −65 | −71 | −65 |

The results show a significant advantage for PTE in terms of its high relative permitivity and low dissipation factor, which make PTE more efficient over extended periods. In addition PTE has significantly better dielectric breakdown performance than MIPB with comparable gassing performance. Overall the physical and electrical properties of PTE make it a highly advantageous dielectric fluid in a wide variety of applications.

We claim:

1. A capacitor comprising at least one layer of dielectric material in which that layer is impregnated with 1-phenyl-1-tetrahydronaphthyl-ethane or an alkyl substituted derivative thereof.

2. A capacitor as claimed in claim 1, which comprises layers of metal foil alternating with a dielectric spacer impregnated with 1-phenyl-1-tetrahydronaphthyl-ethane as dielectric fluid.

3. An electric power cable comprising a conductor surrounded by one or more solid layers of insulation material and provided with at least with one longitudinal conduit, the solid insulation layers and/or the conduit being filled with a dielectric fluid comprising 1-phenyl-1-tetrahydronaphthyl-ethane or an alkyl substituted derivative thereof.

4. An electric power cable according to claim 3 wherein the solid insulation layers and/or the conduit contain a dielectric fluid comprising 1-phenyl-1-tetrahydronaphthyl-ethane.

5. A method according to claim 4 wherein the spark erosion fluid comprises 1-phenyl-1-tetrahydronaphthyl-ethane.

6. In a spark erosion apparatus containing electrodes, the improvement which comprises provided therein a spark erosion fluid comprising 1-phenyl-1-tetrahydronaphthyl-ethane or an alkyl substituted derivative thereof.

7. An improved spark erosion apparatus according to claim 6 wherein the spark erosion fluid comprises 1-phenyl-1-tetrahydronaphthyl-ethane.

8. A method for insulating electrodes which comprises providing therebetween a spark erosion fluid comprising 1-phenyl-1-tetrahydronaphthyl-ethane or an alkyl derivative thereof.

* * * * *